United States Patent [19]
Breitfuss

[11] 3,791,540
[45] Feb. 12, 1974

[54] TRANSPORT VEHICLE HAVING LIFT MECHANISM AND ASSOCIATED EXTENDIBLE AND RETRACTABLE MOBILE OBJECT SUPPORT

[75] Inventor: Thomas K. Breitfuss, Tustin, Calif.
[73] Assignee: Hydro Conduit Corporation, Orange, Calif.
[22] Filed: Sept. 29, 1971
[21] Appl. No.: 184,665

Related U.S. Application Data
[62] Division of Ser. No. 875,743, Nov. 12, 1969, Pat. No. 3,682,334.

[52] U.S. Cl. ............... 214/75 R, 280/34 R, 296/26
[51] Int. Cl. ............................................. B60p 1/44
[58] Field of Search .............. 280/34 A, 35; 296/26; 214/75 R, 75 G, 75 H, 396

[56] References Cited
UNITED STATES PATENTS
2,655,713   10/1953   Chrisman ........................... 214/396
2,822,100   2/1958   Pesta ................................. 214/396
3,561,627   2/1971   Fisher ................................ 214/518
2,823,813   2/1958   Shimmon ........................... 214/671
2,910,203   10/1959  Todd .................................. 214/672

Primary Examiner—Gerald M. Forlenza
Assistant Examiner—Lawrence J. Oresky
Attorney, Agent, or Firm—Wm. Griffith Edwards

[57] ABSTRACT

A wheeled vehicle is disclosed for loading, transporting and unloading heavy objects, including concrete pipe, which has an extendible and retractable mobile object support which travels in an extended position as part of the vehicle when supporting a load and retracts within the vehicle assembly when traveling with the vehicle in unloaded operation. Vehicle assembly is adapted for off and on highway uses.

3 Claims, 3 Drawing Figures

PATENTED FEB 12 1974 3,791,540
FIG. 1
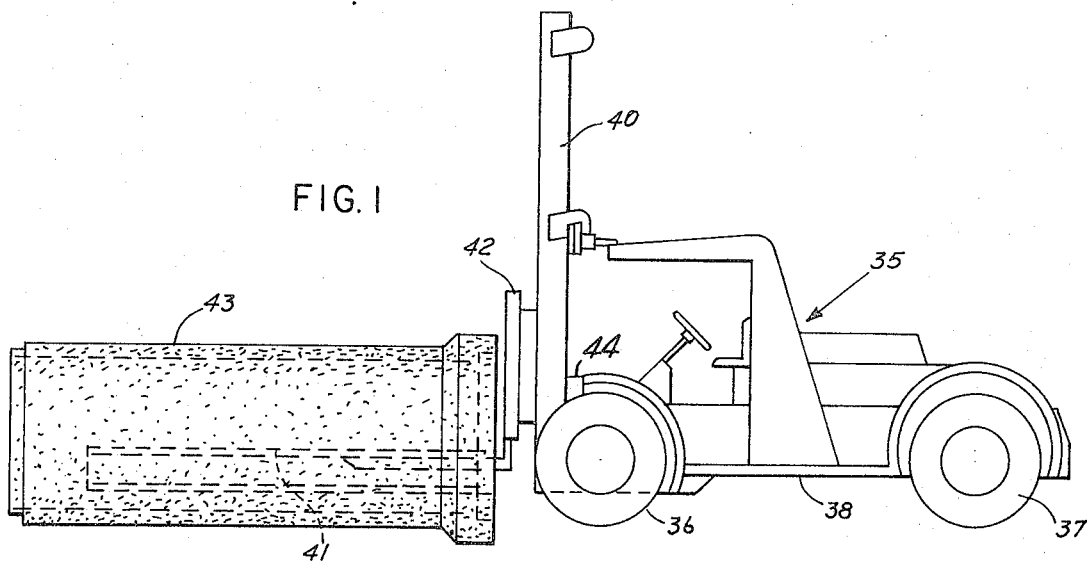
FIG. 2
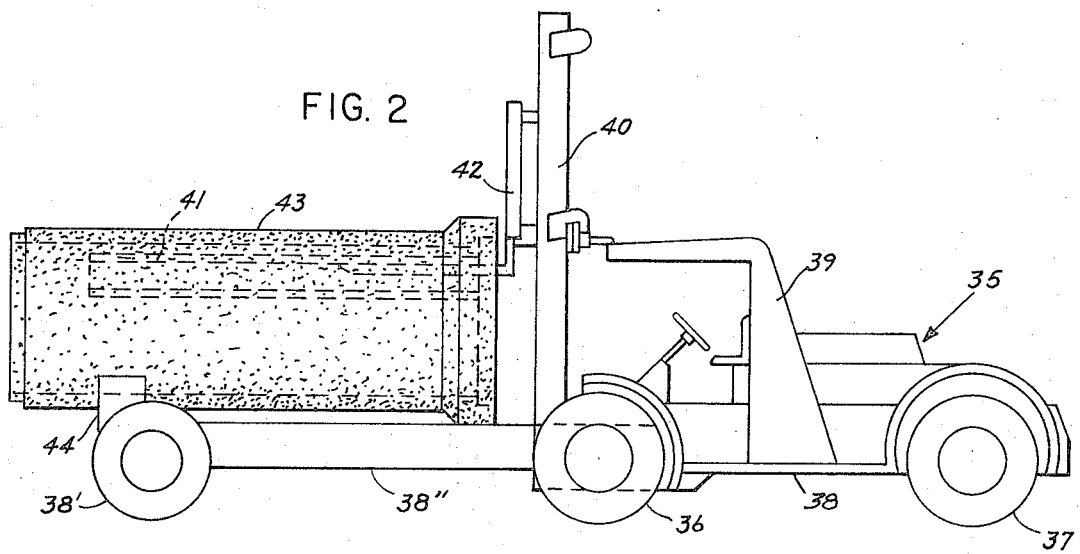
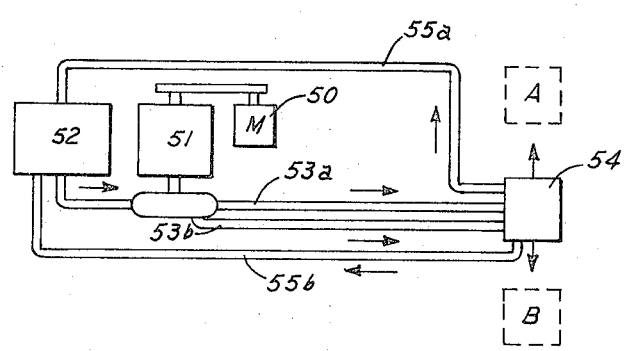
FIG. 3

TRANSPORT VEHICLE HAVING LIFT MECHANISM AND ASSOCIATED EXTENDIBLE AND RETRACTABLE MOBILE OBJECT SUPPORT

This application is a division of application Ser. No. 875,743, filed Nov. 12, 1969, for Load Lifting and Transport Vehicle issued on Aug. 8, 1972 as U.S. Pat. No. 3,682,334.

This invention relates to apparatus for loading and transporting heavy objects, and more particularly to such an apparatus which may be employed to load, transport and selectively deliver a heavy object to a final point of delivery.

At the present time, heavy objects are handled in a production facility by special off-the-highway type lift vehicles which pick up the individual objects and load them on the bed of a large hauling unit, such as a truck, freight car or the like which transports such objects to the site of ultimate use. At the discharge end, substantially the same procedure is employed with the lift vehicles, as aforesaid, operating to lift and unload the objects from the transport vehicle. Once unloaded from the transport vehicle, the heavy objects are lifted again, for example, by a crane, and delivered to the final point of delivery, i.e., the specific place at the use site where the objects are going to be installed or used.

Such multiple handling has the disadvantage of relatively slow movement, first due to the loading and unloading time factor resulting from the slow speed at which the lift type mechanism can be operated and moved to accomplish the loading and unloading functions, and secondly due to the time required to deliver the unloaded objects to their point of final discharge. Also, with respect to the transfer phase, if multiple units are transported on a single vehicle, the rate of travel of such vehicle must be quite slow in order to maintain the heavy load in proper position on the vehicle to prevent tipping, swaying or other driving irregularities.

The present invention represents a number of departures from prior art practices. It provides a vehicle particularly adapted for the combined functions of loading, unloading and delivering bulky heavy objects, such as concrete pipe, a stack of pallets, or other similar objects. Further, the vehicle is particularly suitable for loading, transporting and unloading hollow heavy cylindrical objects. Such a vehicle has a load-carrying capability enabling it to travel under full load condition at relatively rapid speeds. After loading, the load is secured on the vehicle in a balanced load relation so that the vehicle can travel rapidly without tipping, skidding or the like to the place of ultimate discharge of the load.

An innovation employed in a form of the present invention is the provision of a fixed upright support unit on the vehicle which is selectively operable to lift a heavy object from ground support to an elevated position in conjunction with an extendible load cradling structure on the vehicle which is selectively extendible to a position below the elevated heavy object. With the load cradling structure in its extended position, the heavy object may be deposited on the cradle structure. The cradle structure is designed for cradling the heavy object so as to balance the load with respect to the vehicle wheels, thereby to permit rapid transport of the vehicle.

Accordingly, it is a primary object of this invention to provide simple, durable and economical apparatus which can be used to load a heavy object, such as concrete pipe, at a production site and transport it rapidly to a remote storage point or deliver the heavy object to the place of use.

Another object of the invention is to provide a vehicle having a contained lift assembly which is movable from a forward transport position to a rearward load or unloading position and which utilizes the weight of the vehicle as a counterbalance to the load being lifted so as to provide a simple and efficient lifting system.

Yet another object of the present invention is to provide a vehicle having a contained lift assembly which is capable of delivering a heavy transported load directly to the ultimate delivery point.

An additional object of the present invention is to provide a novel load transporting vehicle having extendible load cradling structure and a contained lift assembly operable to deposit a load, such as a heavy bulky object, on the cradle structure when it is in its extended position.

Other objects reside in novel details of construction and novel combinations and arrangements of parts, all of which will be described in detail in the course of the following description.

The practice of my invention will be described with reference to the accompanying drawings illustrating typical structural embodiments particularly suited for the purposes of the invention and shown in more or less schematic form. In the drawings, in the several views of which like parts bear similar reference numerals:

FIG. 1 is a side elevation view of a vehicle embodying features of my invention with its lift mechanism in loading position and its mobile support member in retracted position and concealed from view;

FIG. 2 is another side elevation view of the vehicle shown in FIG. 1, with its mobile support member in an extended position in supporting relation to a loaded object; and FIG. 3 is a flow diagram of a typical hydraulic circuit used in the practice of my invention.

FIGS. 1 and 2 illustrate a preferred form of the present invention in which a fixed upright support unit is mounted on a vehicle for selectively lifting a heavy load and an extendible load cradling structure is included in the vehicle for receiving the heavy load. Once the load has been deposited in the cradle structure for transport by the vehicle, substantially the entire load is in superposed relation with respect to the front and rear wheels of the vehicle. The vehicle 35 shown in FIGS. 1 and 2, which is preferably of the self-propelled type, includes regular forward wheels 36 and rear driving and steering wheels 37. In FIG. 2, forward auxiliary wheels 38' are shown which are selectively movable by operator controlled hydraulic drive from a position in transverse alinement with wheels 36 to the forward position of FIG. 2. The vehicle 35 preferably has a hydraulic, mechanical or pneumatic power system which provides the means for moving the movable vehicle components, other than the vehicle drive system. Vehicle 35 has a frame or chassis 38 including a rearward stationary support member 39 connected at a forwardly extending end to the mast 40. A lift mechanism 42 which includes a forwardly extending lift seat 41 attached thereto is associated with the mast 40.

As shown in FIG. 1, the vehicle 35 has been moved by an operator (not shown) into a work engaging position wherein the lift seat 41 is inserted into the hollow interior of a cylindrical load which has been represented as a length of concrete pipe 43. The lift mechanism 42 thus is ready to begin the ascending movement required to lift the pipe 43 to an elevated position. Once the pipe 43 has been lifted to an elevated position, the wheels 38' are selectively moved forwardly to their extended position in front of the wheels 36. Thereby, the wheels 38' move a cradle structure 44 which is carried on the extension portion of frame 38, indicated at 38'', into a load supporting position. The cradle structure 44 has its seat sufficiently elevated so that when the exterior surface of the concrete pipe 43 is seated on the deck of frame extension portion 38'', the forward end of the pipe 43 will be in slightly elevated relation with respect to its rear end.

Thus, the pipe 43, which is also secured by the lifting seat portion 41 to the cradle structure 44, is stably positioned on the vehicle 35. After the load is in place as illustrated in FIG. 2, the vehicle 35 may be driven at high speed for rapidly delivering the pipe 43 to its point of discharge. There, the sequence of steps is repeated in reverse order with the pipe 43 first elevated from the cradle 44, the extension portion 38'' of the frame 38 including wheels 38' being retracted, after which the lift mechanism 42 lowers the pipe 43 to the position shown in FIG. 1. At that time the vehicle 35 is moved in reverse to separate the pipe 43 from the vehicle 35.

It is noted that in the vehicle 35, the lift mechanism 42 and its lift seat 41 could take the form of a fork lift, boom or other appropriate lift member. Also, the cradle structure 44 which is shown as curved for receiving a cylindrical load could be V-shaped, flat or another form as appropriate for the shape of load to be lifted and transported.

FIG. 3 shows the flow pattern of a hydraulic system of the type referred to above. A motor 50 drives a pump 51, and a reservoir 52 supplies the intake side of pump 51. Output lines 53a or 53b may be operated selectively to conduct the liquid to a component to be moved as shown at 54, and the movement will progress to the selected limit position A or B. Return fluid is delivered through lines 55a and 55b to reservoir 52. The operator has a control means for selecting the associated output and return lines to be put into operation in each movement. Similar circuits are provided throughout the vehicle wherever hydraulic movement is required or employed.

Thus, there has been provided an embodiment of novel apparatus for loading and transporting heavy bulky objects. The novel apparatus further is operable to deliver the heavy objects directly to their final delivery point without rehandling.

I claim:

1. Load lifting and transporting apparatus, comprising:

a vehicle having a lift mechanism at one end operable to lift an object from a rest position on the surface over which the vehicle travels to an elevated position and to lower said object from said elevated position; and a mobile support member mounted on said vehicle, said member being selectively movable relative to said vehicle to an extended position below an object elevated by said lift mechanism whereby said object may be deposited and supported thereon during transport movements of said vehicle, said lift mechanism comprising a selectively operable fork lift arrangement, said mobile support member being supported by at least one wheel which rolls on the same surface as the wheels of the vehicle and said support member being connected to said vehicle during movement to and from the loading position under the fork and during the depositing of a load thereon.

2. Load lifting and transporting apparatus, comprising:

a vehicle having a lift mechanism at one end operable to lift an object from a rest position on the surface over which the vehicle travels to an elevated position and to lower said object from said elevated position;

a mobile support member mounted on said vehicle, said member being selectively movable relative to said vehicle to an extended position below an object elevated by said lift mechanism whereby said object may be deposited and supported thereon during transport movements of said vehicle;

said lift mechanism including cradle means on said mobile support member for receiving and stably supporting said object selectively deposited thereon; and said lift mechanism including a fork portion providing partial support for the object deposited in the cradle means, said mobile support member being supported by at least one wheel which rolls on the same surface as the wheels of the vehicle and said support member being connected to said vehicle during movement to and from the loading position under the fork and during the depositing of a load thereon.

3. Load lifting and transporting apparatus, comprising:

a vehicle having a lift mechanism at one end operable to lift an object from a rest position on the surface over which the vehicle travels to an elevated position and to lower said object from said elevated position; and a mobile support member mounted on said vehicle, said member being selectively movable relative to said vehicle to an extended position below an object elevated by said lift mechanism whereby said object may be deposited and supported thereon during transport movements of said vehicle, said mobile support member being mounted on at least one pair of wheels and being retractable into the vehicle assembly for travel therewith when not being used in support of an object, said mobile support member being supported by at least one wheel which rolls on the same surface as the wheels of the vehicle and said support member being connected to said vehicle during movement to and from the loading position under the fork and during the depositing of a load thereon.

* * * * *